(12) United States Patent
Oelsch et al.

(10) Patent No.: US 6,504,279 B1
(45) Date of Patent: Jan. 7, 2003

(54) MOTOR MOUNT FOR SMALL HIGH SPEED MOTORS

(75) Inventors: Jürgen Oelsch, Hohenroth (DE); Olaf Winterhalter, Epfendorf (DE); Manfred Rauer, St. Georgen (DE); Helmut Hans, St. Georgen (DE)

(73) Assignee: Precision Motors Deutsche Minebea GmbH (DE)

( * ) Notice: Subject to any disclaimer, the term of this patent is extended or adjusted under 35 U.S.C. 154(b) by 0 days.

(21) Appl. No.: 09/701,227
(22) PCT Filed: May 27, 1999
(86) PCT No.: PCT/EP99/03654
§ 371 (c)(1),
(2), (4) Date: Nov. 27, 2000
(87) PCT Pub. No.: WO99/61810
PCT Pub. Date: Dec. 2, 1999

(30) Foreign Application Priority Data

May 27, 1998 (DE) .......................................... 198 23 630

(51) Int. Cl.⁷ .................................................. H02K 7/09
(52) U.S. Cl. ...................................... 310/90.5; 310/90
(58) Field of Search ....................... 310/90, 90.5, 68 R, 310/184; 384/107, 100–115, 118, 120

(56) References Cited

U.S. PATENT DOCUMENTS

| | | | | |
|---|---|---|---|---|
| 4,353,602 A | * | 10/1982 | Habermann | ................ 310/90.5 |
| 4,443,043 A | * | 4/1984 | Yamaguchi | .................. 384/113 |
| 4,538,081 A | * | 8/1985 | Kamiya et al. | ............. 384/115 |
| 4,701,651 A | | 10/1987 | Tanaka | |
| 4,920,291 A | * | 4/1990 | McSparran | ................. 310/90.5 |
| 5,027,280 A | * | 6/1991 | Ando et al. | ................. 310/90.5 |
| 5,073,737 A | | 12/1991 | Yamamura | |
| 5,126,612 A | * | 6/1992 | Girault | ....................... 310/90.5 |
| 5,172,021 A | | 12/1992 | Takahashi et al. | |
| 5,271,677 A | | 12/1993 | Sherman et al. | |
| 5,289,067 A | | 2/1994 | Tanaka et al. | |
| 5,739,609 A | | 4/1998 | Ueyama et al. | |
| 5,973,430 A | * | 10/1999 | Brunet | ....................... 310/90.5 |
| 6,081,057 A | * | 6/2000 | Tanaka et al. | ................. 310/90 |
| 6,118,199 A | * | 9/2000 | Lembke | ..................... 310/90.5 |

FOREIGN PATENT DOCUMENTS

| | | |
|---|---|---|
| DE | 22 48 695 | 4/1974 |
| DE | 33 25 985 | 2/1984 |
| DE | 43 09 759 | 9/1993 |
| EP | 580 201 | 1/1994 |
| EP | 687 827 | 12/1995 |
| GB | 2 258 699 | 2/1993 |
| JP | 1-12126 | 4/1989 |
| JP | 5-106635 | 8/1993 |
| JP | 5-231427 | 12/1993 |
| JP | 08170642 | 7/1996 |

* cited by examiner

*Primary Examiner*—Tran Nguyen
(74) *Attorney, Agent, or Firm*—The Maxham Firm

(57) ABSTRACT

A motor mount for small high-speed motors, consisting of radial and axial bearing components. The axial bearing is configured as a magnetic bearing and the radial bearing as an air bearing.

12 Claims, 4 Drawing Sheets

MOTOR MOUNT FOR SMALL HIGH SPEED MOTORS

BACKGROUND OF THE INVENTION

1. Field of the Invention

This invention relates to low-power high-speed motors which are operated at speeds of up to 20,000 rpm, and more particularly to a bearing that operates with the lowest possible friction and without play for such motors.

2. Discussion of Related Art

Motors of the type to which the present invention applies are typically employed as the drive in disk storage devices, as well as in the drives for scanners, copiers and similar small devices.

All such motor designs have in common the fact that a rotor dome, which is driven to rotate, is arranged on a stationary base flange and is supported on the base flange with appropriate axial and radial bearings. It is a known drive principle to arrange a stator package on the base flange so that it works together with a magnet arranged over an air gap with a driven rotor on the inside, that is, the so-called rotor dome. Thus, rotation of the rotor dome is induced by the magnetic return due to an appropriately applied rotational field in the stator package.

It is customary with such low-power motors to equip the rotor, that is, the rotor dome, which is rotating at a high rpm, with radial and axial bearings. The bearings should operate with the lowest possible friction. A typical design for such a bearing arrangement consists of using a grooved ball bearing which acts both as a radial bearing and as an axial bearing. Such ball bearings have the disadvantage that they must be lubricated and may sometimes cause mechanical vibrations which are unwanted and shorten the useful life of the motor. Furthermore, this vibration can have a negative effect on the object arranged on the rotor dome, for example, a data storage device (hard drive), so that accuracy in reading and writing is thereby impaired.

It is also known that the radial bearing component can be separated from the axial bearing component by arranging two different bearings, each of which assumes one bearing function. It is known that a so-called needle bearing or roller bearing, which takes up the radial bearing component, may be used as the radial bearing, and it is also known that a ball bearing or a fluid bearing may be used as the axial bearing.

Additionally, the bearing combination of two air cushion bearings or two fluid bearings is known. In this case it is known that an air cushion bearing is provided to take up the radial bearing components as well as a second air cushion bearing which is provided to take up the axial bearing components.

The arrangement of an air cushion bearing to take up axial bearing components is relatively difficult and expensive because the required tolerances in this axial bearing clearance must be kept very narrow, which greatly increases the manufacturing costs of such a bearing.

U.S. Pat. No. 5,289,067 discloses a small motor having radial and axial bearing components. A rotationally driven rotor dome is mounted on a shaft of a stationary base flange by the bearing components. The radial bearing is designed as a hydrodynamic bearing and the axial bearing is designed as a passive magnetic bearing in the form of a ring-shaped permanent magnet in which a magnetically active metal disk is arranged centrally and has a rotationally fixed connection to the rotor dome.

SUMMARY OF THE INVENTION

A primary purpose of this invention is to improve upon a low-power motor having a bearing arrangement of the type defined above so that in the case of the presence of a radial bearing of any type, the cost of production of the respective and separate axial bearing is significantly reduced, while at the same time achieving substantially improved bearing properties.

An important feature of this invention is that a magnetic axial bearing is designed as an active magnetic bearing and has two coils which serve to produce two independent magnetic fields which act on the metal disk arranged between the two coils, with the metal disk being attached in a rotationally fixed but detachable manner to the rotor dome by the magnetic force of a permanent magnet.

An important advantage of the invention is that now a magnetic bearing designed as an active magnetic bearing is used as the axial bearing.

In a first embodiment of the present invention, the active magnetic bearing operates on one side against a magnetic bias, while in a second embodiment, the active magnetic bearing operates on two sides against a magnetic bias applied from both sides.

Another significant feature of this invention is that the axial magnetic bearing is arranged on one side, that is, on the one side of the rotor dome, and not on both sides. This yields the important advantage that the bearing is much less expensive because, thanks to this arrangement, the axial magnetic bearing is capable of accommodating both axial forces acting in one direction is well as in the other direction, although there is only a single bearing. This also yields the additional advantage that dismantling is simplified because the rotor dome can be removed simply by lifting it up, so the axial magnetic bearing arranged inside the rotor dome is separated. Thus, it is not necessary to dismantle a second bearing (not included in this configuration) as might be the case in the known related art.

It is thus important that the active magnetic bearing can be arranged either on the top inside of the rotor dome or in a different embodiment on the lower side of the rotor dome. In both embodiments, it is important that only a single axial magnetic bearing is present, because it operates against biases on both sides so that it is capable of taking up the axial bearing forces acting in both directions. This greatly reduces the cost of manufacturing such a low-power motor, and furthermore, the rotor dome is stabilized because it is protected against tilting by the axial magnetic bearing. There are no mechanical vibrations such as those known to occur with mechanical bearings, and thus it runs more smoothly and quietly. This also results in an improved useful life for the motor.

In a preferred embodiment of the present invention, the axial magnetic bearing consists essentially of a coil with a magnetic return ring which is thermally separated from the radial air cushion bearing. This coil acts in the axial direction on an armature which is consequently attracted by this coil to varying extents in the axial direction. After the armature is fixedly connected to the rotor dome, the rotor dome is thus more or less adjusted in the axial direction due to appropriate energization of the coil in the axial direction.

The axial bias of the rotor dome against which the coil, which receives an electric current, operates is achieved in the first embodiment by means of two oppositely polarized permanent magnets which, for example, repel one another with their two identical poles and thus exert a repulsion effect on the rotor dome which is in turn counteracted by the coil receiving the electric current. In this way, the axial bearing play of the rotor dome can be adjusted with an extremely high precision through the electric current acting on the coil.

To set a certain dimension, it is preferable to use a sensor that monitors the axial bearing play and is connected to the power supply of the coil through an assigned control system, thus guaranteeing automatic control of the bearing play at a constant level. This bearing play is, of course, designed to be adjustable.

Various embodiments of position sensors may be used here. In a first embodiment, there is a sensor that acts by capacitance or inductance, measuring the distance in the bearing gap from a stationary face to the opposite rotating face and detecting it accordingly. In another embodiment, the sensor may be designed as an optical sensor, and the adjustment of the axial bearing play may take place by means of an optical sensor.

In a third embodiment, an inductive sensor may be provided in such a manner that a stationary induction coil in which a suitable induction voltage is induced is arranged opposite the rotating magnet arranged in the rotor dome. Depending on the size of the axial air gap between these two parts, an induction voltage of various levels is induced in the induction coil in direct proportion to the axial bearing play. Likewise, the bearing play can also be regulated with a high precision in this way.

In another embodiment of the present invention, instead of a permanent magnetic bias of the rotor:dome in the axial direction, an active bias can be produced by two oppositely directed coils forming an air gap between them by the rotation of a disk in fixed rotational connection to the rotor dome. Depending on the current acting on the upper and lower coils, the metal disk which is fixedly connected to the rotor dome is moved upward or downward axially, thus also adjusting the magnetic bearing accordingly.

Whereas in the first embodiment a current-carrying coil and a paired arrangement of permanent magnets was used, in the second embodiment two current-carrying coils are used, forming an. air gap between them where a metallic and magnetically active disk rotates, the disk being attached to the rotor dome in a rotationally fixed manner. Depending on the current flowing in the upper and lower coils, the disk connected to the rotor thus moves upward or downward axially, again with precise control of this axial adjustment play being achieved due to the above-mentioned position sensor and the above-mentioned control.

In a third embodiment of the present invention, an air cushion bearing is again combined with an axial magnetic bearing, but in this case the air cushion bearing does not function as a purely radial bearing but instead is capable of taking up both radial and axial bearing components. It is preferable here if this air cushion bearing is designed as a toroidal bearing which, by definition, takes up both axial and radial bearing components.

In the design of the active magnetic bearing as an axial bearing, the two above-mentioned embodiments are again possible. This means that it is preferable according to this invention if a cylindrical air cushion bearing or a toroidal bearing is used as the radial bearing, while a magnetic bearing is always used as the axial bearing.

In another embodiment, the bearing pair combining the above-mentioned radial and essentially cylindrical air cushion bearing with an axial air cushion bearing which is in turn combined with the above-mentioned axial magnetic bearing is also used. This design uses an air cushion bearing arrangement consisting of a radial air cushion bearing in combination with an axial magnetic bearing. This also yields some important advantages because more accurate axial positioning of the rotor dome is possible due to a well-thought-out arrangement of an additional axial air cushion bearing. This additional axial air cushion bearing then acts as an additional carrier which stabilizes the tilting vibrations and thus also leads to a further improvement in the smooth running of the rotor.

BRIEF DESCRIPTION OF THE DRAWING

The objects, advantages and features of the invention will be more readily appreciated from the following detailed description, when read in conjunction with the accompanying drawing, in which.

DETAILED DESCRIPTION OF THE PREFERRED EMBODIMENTS

Figure 1:
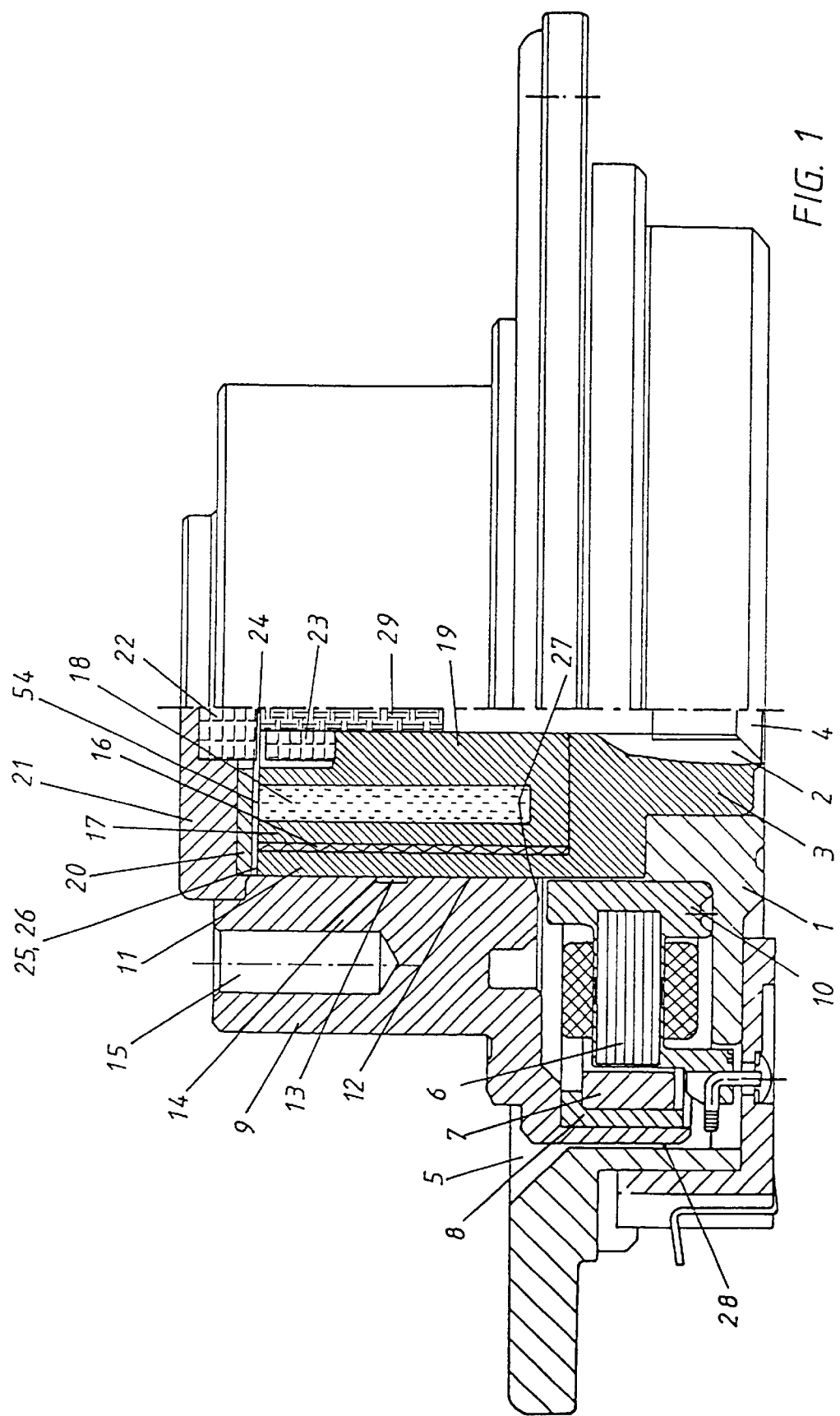
FIG. 1 is a partial sectional view of a first embodiment of a bearing according to the invention, showing a radial air cushion bearing, an axial magnetic bearing, and a permanent magnetic bias.

With reference now to the drawing, and more particularly to FIG. 1, base flange 1 is formed with central recess 2 in which shaft 3 is fixedly mounted by screw 4. The base flange has in its recess 5 stator package 6 consisting essentially of inner sleeve 10 from which the core with the stator winding extends radially outward in a known way.

Rotor dome 9 is rotationally mounted on shaft 3 and has on its lower inside a ring magnet 7 which is arranged on the periphery of the rotor dome and is entrained by the rotational field generated in stator package 6. The ring magnet is inserted radially outward into magnetic return ring 8 which closes the magnetic circuit in the rotor. Bearing sleeve 11 is arranged on shaft 3 in a rotationally fixed manner, its radial outside being designed as air cushion bearing 12.

The FIG. 1 embodiment illustrates that the air cushion bearing is designed as a radial bearing and extends over a suitable axial length of bearing sleeve 11. Furthermore, there are air channels 14 emanating from connection channel 15, these air channels in turn leading to connection channels 13 which supply the entire air cushion bearing 12 with air fed in from the outside.

It is important here that air cushion bearing 12 has a spiral groove structure, which is not shown in detail here, and with which it is possible for air to be automatically drawn in through connecting channel 13 while rotor dome 9 is rotating, and to be fed under pressure into air cushion bearing 12. This yields a self-supplying air cushion bearing 12 which has an appropriate rigidity at higher rotational speeds.

Bearing sleeve 11 has thermal insulation 16 on the inside which is also designed as a sleeve and is made of a material with low thermal conductivity. Radially on the inside of the thermal insulation 16 there is outer magnetic return ring 17 on which coil 18 is in turn arranged on the inside. Radially inward from coil 18 is inner magnetic return ring 19. The two magnetic return rings 17 and 19 are magnetically connected to one another. When a DC electric current is applied to coil 18, the coil acts in the axial direction on gap 54 at the upper end.

At a slight distance from the upper end side of coil 18 is arranged armature 20, which is connected to rotor dome 9 in a rotationally fixed manner and is in turn sealed by cover 21, which is made of metal. Armature 20 is thus pulled in the axial direction by the end face of coil 18 to varying extents, depending on the extent to which the coil is supplied with a DC current.

In contrast with the attractive effect of coil 18 on armature 20, a magnetic bias is provided which in the embodiment shown here consists of two similarly polarized permanent magnets 22, 23, with permanent magnet 22. being arranged in cover 21 in a rotationally fixed manner and consequently rotating with rotor dome 9, while permanent magnet 23 is connected to inner magnetic return ring 19 in a fixed manner. Between permanent magnets 22, 23, a repulsive force is thus generated in the area of distance 24, counteracting the attractive force of coil 18 on armature 20. Thus, gap 54 between the end face of magnetic return rings 19, 17 and the bottom side of armature 20 can be adjusted with a very high precision. Furthermore, to regulate this distance, position sensor 29 is arranged in stationary permanent magnet 23 to detect distance 24 from the opposite rotating face and to control the coil current accordingly. The bearing gap is also continued in the form of air gap 25.

As was mentioned previously, in the case of modifications of this invention air cushion bearing 26 may be provided instead of bearing gap 25, so that radial air cushion bearing 12 shown here can still be combined with air cushion bearing 26 which acts in the axial direction. Moreover, rotor dome 9 also has air gaps 27, 28 in addition to the stationary parts of base flange 1 to guarantee free rotation.

Figure 2:
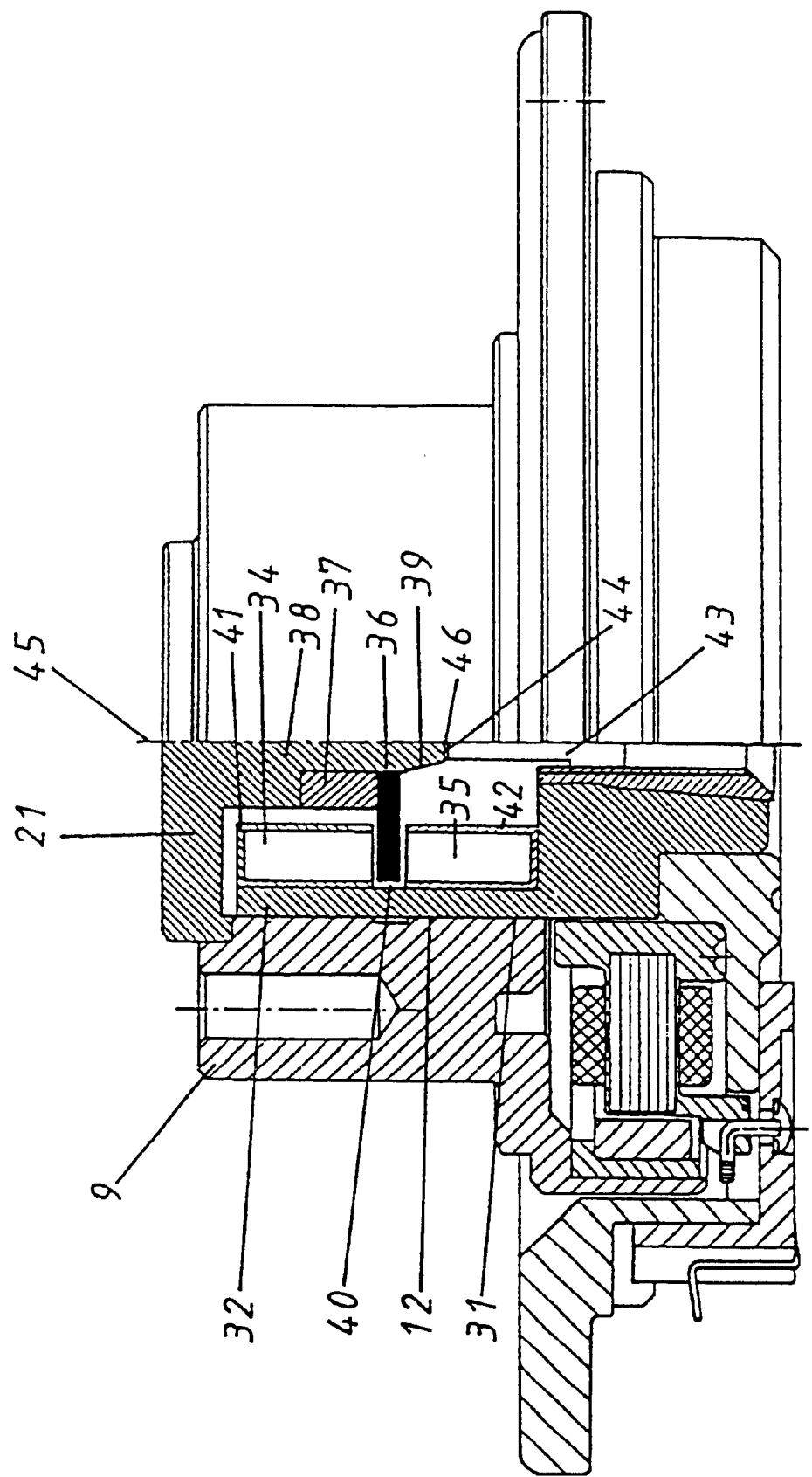
FIG. 2 is partial sectional view through a second embodiment of the invention having a radial air cushion bearing and a double-acting axial magnetic bearing.
Figure 3:
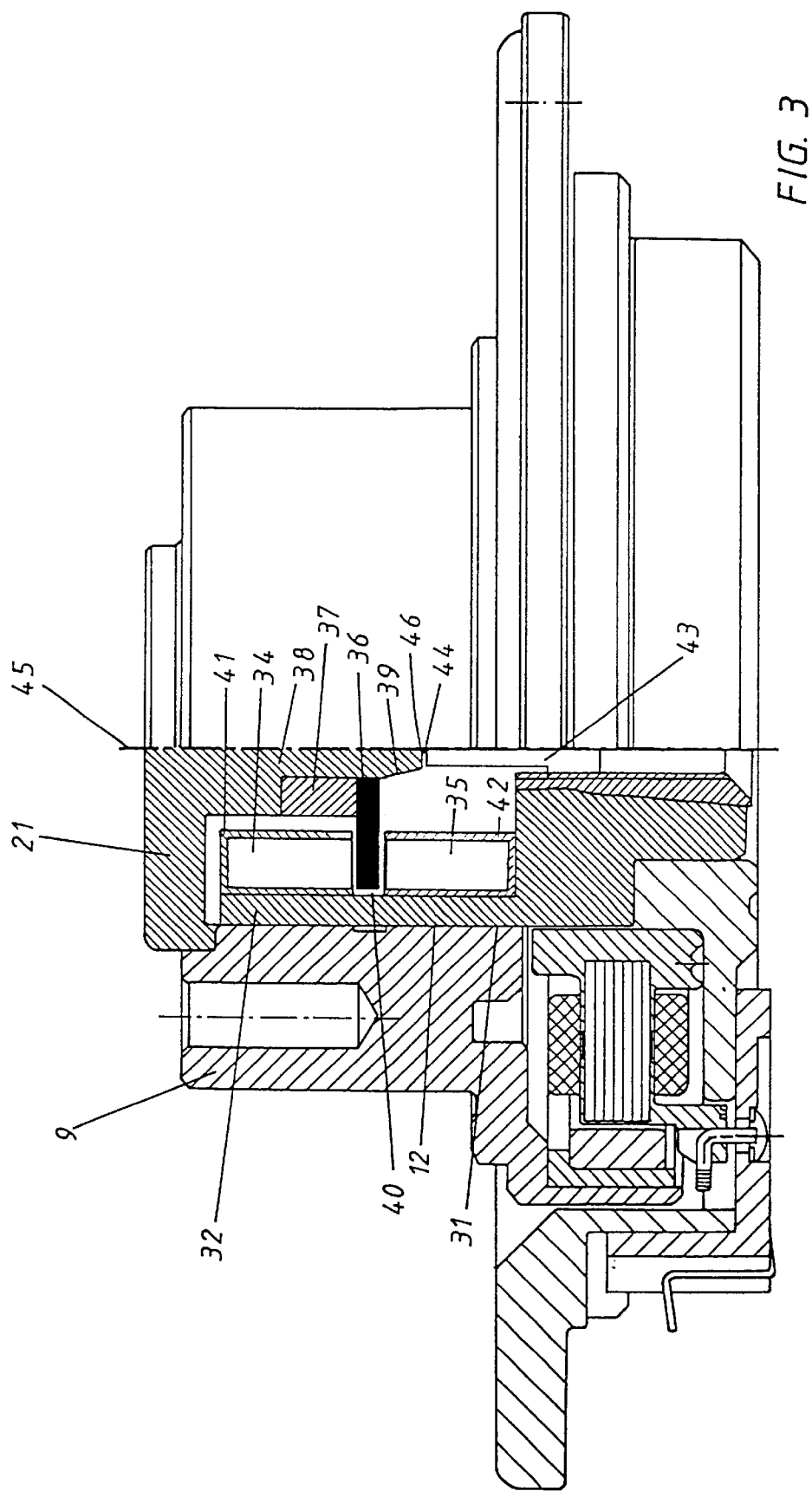
FIG. 3 is an enlarged detail of FIG. 2.

FIGS. 2 and 3 illustrate an additional embodiment where, instead of creating a permanent magnetic bias on rotor dome 9, a controllable magnetic bias can be generated by the fact that two oppositely polarized coils 34, 35 create an air gap 40 between them in which a magnetically active metal disk 36 rotates.

It is proposed here that lower stationary coil 35 be arranged on the shaft in coil return 42, opposite upper coil 34 which is also stationary in coil return 41. The above-mentioned air gap 40, in which the magnetically active metal disk 36 rotates, is arranged between the two coils 34, 35. It is important here that metal disk 36 is connected to the rotor dome in a rotationally fixed manner. A special arrangement is provided for connecting metal disk 36 to the rotor dome.

As explained previously, the rotor dome is connected to cover 21. A recess is provided on the inside of the cover, with magnet 37 being mounted in this recess by means of fastening device 38. Thus, magnet 37 rotates together with the cover and the rotor dome.

The inside perimeter of disk 36 is in contact with cover 21 on centering bevel 39, so that metal disk 36 is centered precisely with respect to center line 45. Magnet 37 attracts this metal disk magnetically and entrains it. Thus, the metal disk is centered both axially and radially precisely with respect to center line 45 because of this magnetic entrainment.

Thus, simple assembly of the entire arrangement is possible, because to dismantle the arrangement, one need only lift up cover 21 together with rotor dome 9, which also lifts magnet 37, thus canceling the magnetic attraction for metal disk 36. The metal disk may thus remain in the arrangement and need not be dismantled itself.

A magnetic bearing is now proposed because coils 34, 35 are each supplied separately with electric current and generate independent magnetic fields in air gap 40 between them, causing metal disk 36 to move more or less upward or downward axially. It is preferable here that coils 34, 35 are supplied with electric current so that the metal disk is automatically held in an approximately central area in air gap 40 (on elimination of the control).

In addition, a control is also superimposed on this to guarantee a precision adjustment of metal disk 36 in air gap 40. To do so, stationary position sensor 43 is again provided, detecting with its end edge an opposite edge 46 on the rotating rotor dome across distance 44. This distance 44 is thus detected continuously by position sensor 43 and a control segment is entered as an actual value. On the basis of FIGS. 2 and 3 it can be shown that radial air cushion bearing 12 extends from position 31 to position 32.

In order for any disk-shaped data carrier which might also be present to be entrained with the rotor dome, an entraining element in the form of spring 33 is provided, which is supported on cover 21 on one side and on the other side is supported on the top of the disk-shaped data carrier.

Figure 4:
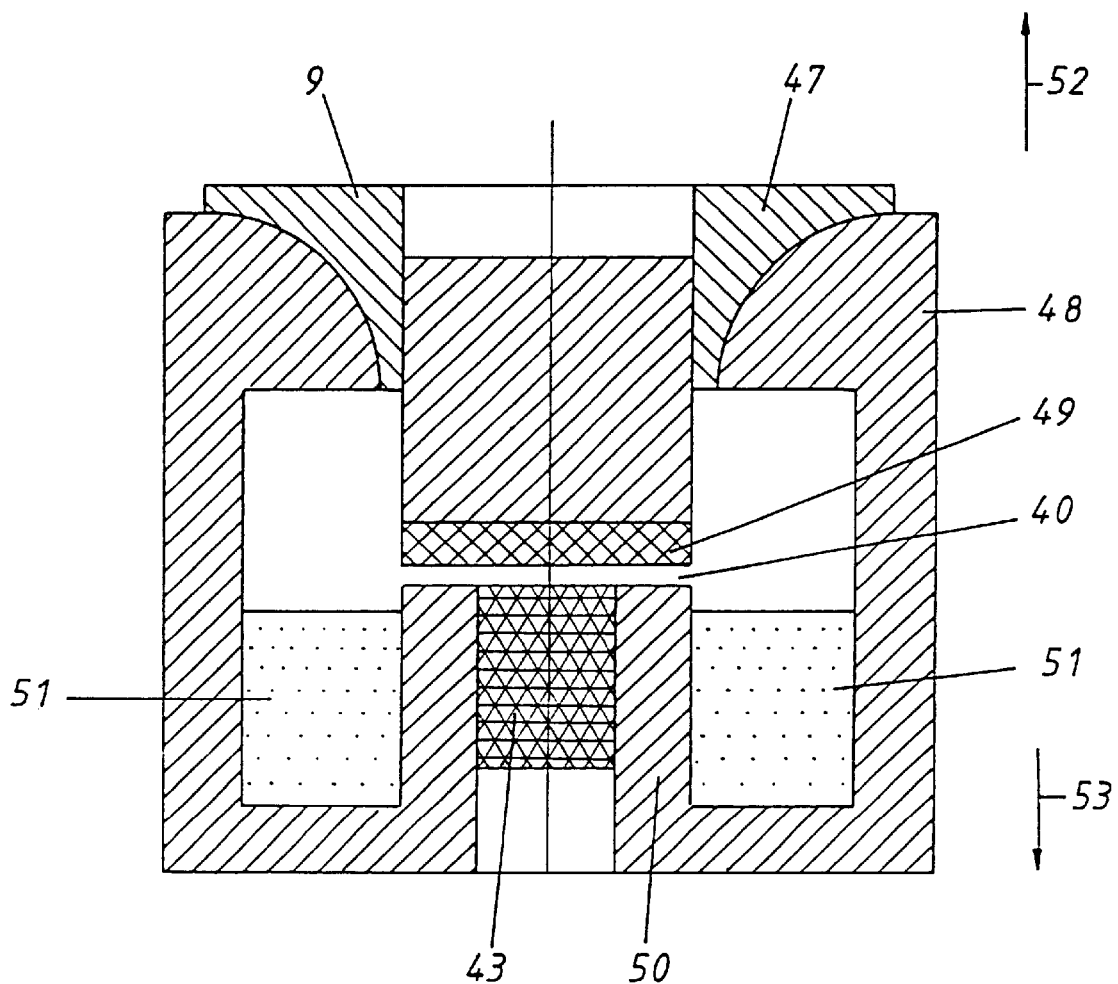
FIG. 4 shows another embodiment, in section, of this invention, having a toroidal air cushion bearing in combination with an axial magnetic bearing.

In a last embodiment, the above-mentioned magnetic bearing (according to FIGS. 1–3) can be combined with a toroidal air cushion bearing. Such an air cushion bearing 47 is illustrated in FIG. 4 where it can be seen that this air cushion bearing can take up both axial bearing components and radial bearing components and can also be combined with an additional magnetic axial bearing. Specifically it can be seen here that there is a stator 48 in which at least one coil 51 is present, acting on opposite pole 50 which, in turn, has its end face opposite permanent magnet 49 so that again a carrying force is produced by the fact that an attractive force acting in the direction of arrow 53 is generated in the air gap, while a repulsive force in the direction of arrow 52 is generated by the above-mentioned toroidal air cushion bearing. Here again, the distance in air gap 40 can be regulated with a high precision through appropriate control.

It can be derived from the embodiment mentioned last that the present invention is not limited to a combination of a radial air cushion bearing with an axial magnetic bearing, but it includes a combination of a radial air cushion bearing and an axial air cushion bearing which, in turn, may also be combined with an axial magnetic bearing. Experiments have shown that superior smooth running is achieved together with low manufacturing cost and a long life at the same time. The term hydrodynamic bearing is understood to refer to an air cushion bearing or a fluid bearing. Instead of air as the bearing medium, a liquid is used with a fluid bearing.

What is claimed is:

1. A motor bearing for a high-speed low power motor comprising a rotationally driven rotor dome mounted on a shaft mounted on a stationary base flange, said bearing comprising:

a hydrodynamic bearing; and
   an active magnetic axial bearing comprising:
      a magnetically active metal disk;
      a permanent magnet;
      a first coil generating a first magnetic field;
      a second coil generating a second magnetic field independent of the first magnetic field;
      said metal disk being positioned between said first and second coils;
      said first and second independent magnetic fields acting on said metal disk, said metal disk being rotationally coupled to said rotor dome by the magnetic force of the permanent magnet and at least one of the independent magnetic fields in a detachable manner.

2. The motor bearing according to claim 1, and further comprising:

a rotor dome cover formed with a centering bevel;

said metal disk having a central bore therethrough;

said metal disk being centered radially and axially on its central bore through said centering bevel on said cover.

3. The motor bearing according to claim 1 or 2, wherein said metal disk remains between said first and second coils even after being released from said rotor dome.

4. The motor bearing according to claim 1 or 2, and further comprising:

a sensor;

any magnetic adjustment in said axial bearing is controlled by means of the current in said first and second coils pursuant to signals from said sensor.

5. The motor bearing according to claim 1 or 2, wherein said axial bearing operates on two sides against a magnetic bias from both sides.

6. The motor bearing according to claim 1 or 2, wherein said axial bearing alone as the single magnetic bearing arranged on said motor axle takes up the axial forces from both directions.

7. The motor bearing according to claim 1 or 2, wherein said axial magnetic bearing takes up radial forces to prevent tilting.

8. The motor bearing according to claim 6, wherein said axial magnetic bearing also takes up radial forces to prevent tilting.

9. The motor bearing according to claim 1 or 2, wherein said hydrodynamic bearing is a radial bearing designed as an air cushion bearing in the form of a toroidal bearing which is suitable for taking up axial forces in addition to radial forces.

10. The motor bearing according to claim 1 or 2, wherein said hydrodynamic bearing is a radial bearing comprising an air cushion bearing and a toroidal bearing.

11. The motor bearing according to claim 1 or 2, wherein said axial magnetic bearing is thermally isolated with respect to said radial bearing.

12. The motor bearing according to claim 10, wherein said axial magnetic bearing is thermally isolated with respect to said radial bearing.

* * * * *